United States Patent [19]
Vischer, Jr.

[11] 3,841,741
[45] Oct. 15, 1974

[54] EYEGLASS FRAME
[76] Inventor: Alfred Vischer, Jr., 6111 E. San Marino St., Tucson, Ariz. 85715
[22] Filed: Sept. 21, 1971
[21] Appl. No.: 182,389

Related U.S. Application Data
[63] Continuation-in-part of Ser. No. 100,142, Dec. 2, 1970, abandoned.

[52] U.S. Cl.............. 351/120, 16/128 A, 351/153
[51] Int. Cl............................ G02c 5/20, G02c 5/22
[58] Field of Search............ 351/120, 111, 41, 153; 16/128 A; 287/91; 403/53, 92

[56] References Cited
UNITED STATES PATENTS
| | | | |
|---|---|---|---|
| 363,632 | 5/1887 | Hummel | 351/111 X |
| 847,717 | 3/1907 | Althin | 351/153 X |
| 1,504,212 | 8/1924 | Carlson | 351/153 |
| 3,060,804 | 10/1962 | Rogers | 351/120 |
| 3,271,094 | 9/1966 | Wildermuth | 351/120 |

FOREIGN PATENTS OR APPLICATIONS
| | | | |
|---|---|---|---|
| 1,121,534 | 7/1968 | Great Britain | 351/120 |
| 1,552,667 | 11/1968 | France | 351/120 |

Primary Examiner—Paul A. Sacher
Attorney, Agent, or Firm—Fidler, Patnaude & Batz

[57] ABSTRACT

An eyeglass frame includes a hinge member having a cylindrical end pivotally received in a cylindrical recess in the lens frame and an adjustable connection to the temple member to permit adjustment of the angle at which the temple member meets the lens frame. In a preferred embodiment, a pair of pivot pins extend through the cylindrical end of the hinge member, heads on the pivot pins being embedded in the lens frame.

12 Claims, 14 Drawing Figures

PATENTED OCT 15 1974

INVENTOR.
ALFRED VISCHER, JR.

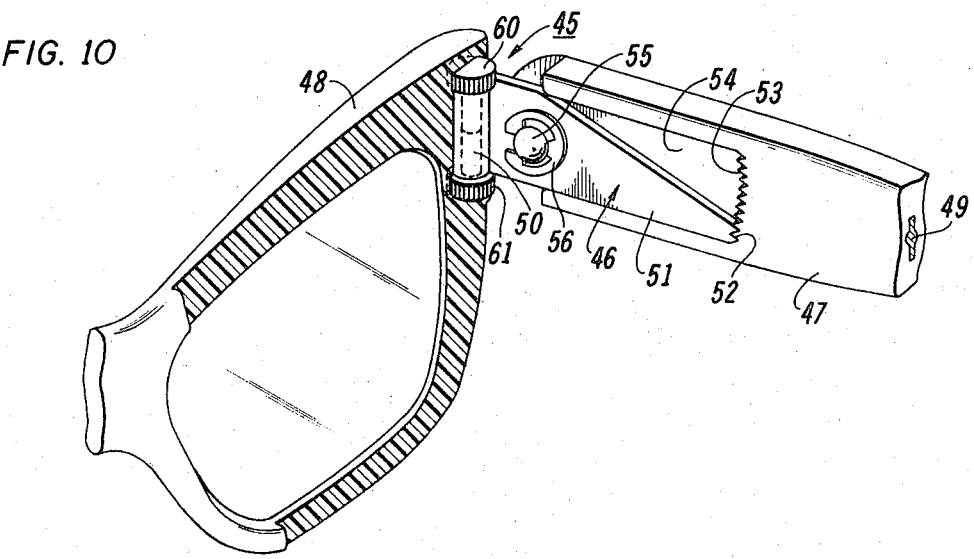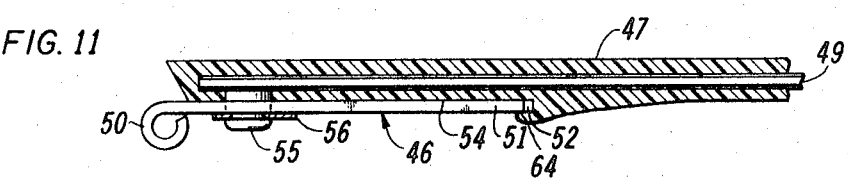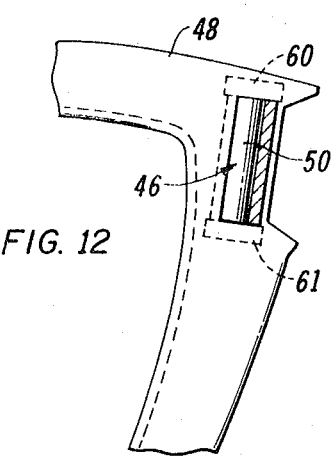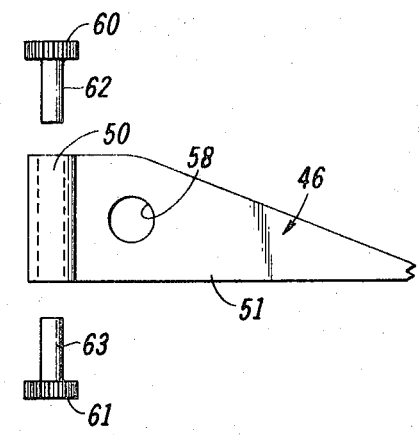

EYEGLASS FRAME

This application is a continuation-in-part of application Ser. No. 100,142 filed Dec. 2, 1970 by Alfred Vischer, Jr., now abandoned.

The present invention generally relates to eyeglass frames and it relates more particularly to a new and improved hinge assembly suitable for attaching the temple members to the lens frames of eyeglasses.

The prior art type of eyeglass hinge has generally comprised a pivot screw and two hingedly connected parts which are respectively attached, as by rivets or screws, to the lens frame and to the temple member. In addition to being relatively expensive and bulky, such hinges frequently come apart by loss of the pivot screw, and inherently they prevent the temple members from lying directly against the lens frame when the temple members are folded, adding considerably to the thickness of the glasses. Another disadvantage of such prior art hinges is that they have not included any means for adjusting the angle at which the temple members intersect the plane of the lens frame. Consequently, in order to adjust the eyeglasses to fit the user, it has been necessary to actually bend the hinge metal, thereby weakening it and sometimes damaging the lens frame or the temple members. Moreover, the adjustment by bending is very limited.

Therefore, an object of the present invention is to provide a new and improved eyeglass frame construction.

Another object of the present invention is to provide a new and improved hinge which may be used in eyeglass frames.

A further object of the present invention is to provide a new and improved eyeglass frame which enables adjustment of the angle at which the temple member intersects the plane of the lens frame, which is durable in construction, and which permits the temple members to be folded against the lens frame in a manner more compact than that provided by the prior art hinge constructions.

Briefly, the above and further objects may be realized in accordance with the present invention by providing a hinge member having a curled-over, cylindrical end portion which pivotally fits in a generally cylindrical recess formed in the lens frame. The hinge piece is suitably secured to the temple member at an adjustable, angular position in the vertical plane thereby permitting independent adjustment of the temple members without bending. In one embodiment of the invention, novel means in the form of a screw, nut and washer assembly are used to hold the hinge piece in locked assembled relationship with the lens frame.

In the preferred embodiment of the invention the curled end of the hinge piece is molded directly into the lens frame together with a pair of headed pivot pins each having a shank portion extending into the curled end of the hinge thereby to provide internal bearing surfaces for the curled end of the hinge piece.

The invention, both as to its organization and method of operation, together with further objects and advantages thereof will best be understood by reference to the following detailed description taken in connection with the accompanying drawings, wherein:

FIG. 10 is a fragmentary, partially sectioned view of another embodiment of the invention providing both internal and external bearing surfaces for the hinge piece;

FIG. 11 is a cross-sectional, fragmentary view of the temple and hinge assembly employed in the construction of FIG. 10;

FIG. 12 is a fragmentary view of a corner portion of the lens frame and hinge assembly with the temple member removed;

FIG. 13 is an exploded view of the hinge assembly; and

FIG. 14 is a fragmentary side elevational view of the frame and hinge assembly.

Figure 1:
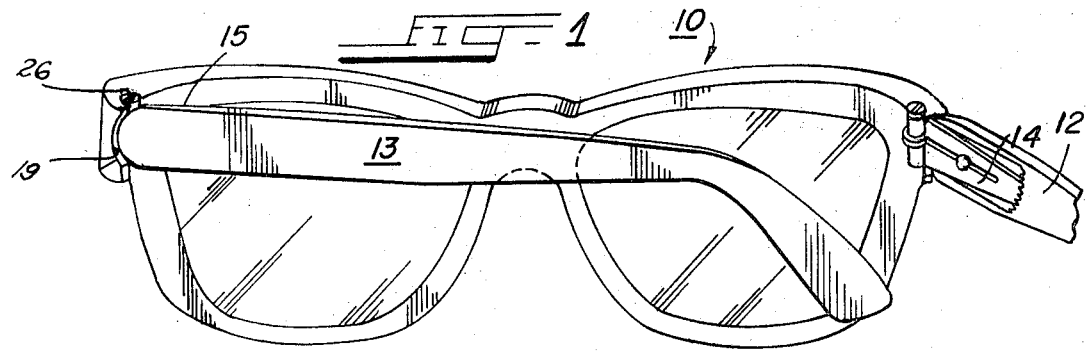
FIG. 1 is a fragmentary, perspective view of an eyeglass frame embodying the present invention.

Referring now to the drawings, there is shown in FIG. 1 an eyeglass frame 10 including two lens holder apertures, a right-hand temple member 12, and a left-hand temple member 13. The temple members 12 and 13 are pivotally connected to the lens frame 10 by means of a pair of hinge pieces 14 and 15 which are mirror images of one another. As more fully described hereinafter, the temple members 12 and 13 are respectively secured to the hinge pieces 14 and 15 at an adjustable angle so that the respective angles at which the temple members 12 and 13 intersect the plane of the lens frame 10 may be easily adjusted at the time the eyeglasses are fitted to the user.

The hinge pieces 14 and 15 have cylindrical forward end portions which are received in generally cylindrical sockets in the lens frame 10. It is apparent from FIG. 1 that the lens frame 10 is symmetrical with respect to the central vertical axis intersecting the bridge of the frame, and therefore, only the left-hand portion of the frame and the hinge 15 are described in detail hereinafter. It will be understood that the hinge piece 14 is attached in exactly the same manner to the right-hand edge of the lens frame as shown in FIG. 1.

Figure 2:
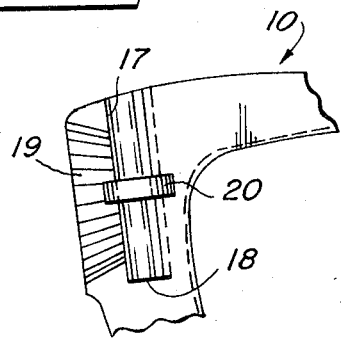
FIG. 2 is an enlarged view of a corner portion of the eyeglass frame of FIG. 1 showing the hinge socket formed therein.
Figure 3:
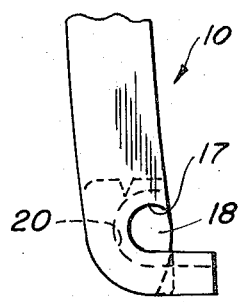
FIG. 3 is a fragmentary, top view of the corner portion of the eyeglass frame shown in FIG. 2.
Figure 4:
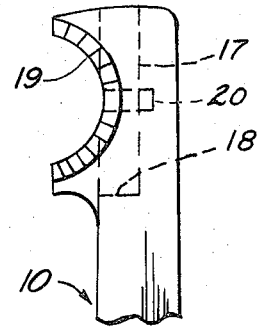
FIG. 4 is a fragmentary, side elevational view taken from outside of the right-hand corner of the eyeglass frame as shown in FIG. 1.

Referring to FIGS. 2, 3, and 4, it may be seen that the lens frame 10 is provided with a generally cylindrical recess 17 which is open along the rear side through an angle of substantially less than 180°. As shown, the recess 17 is closed at the bottom end 18. Midway between the open upper end and the closed lower end of the recess 17, there is provided a large hemispherical recess 20 for receiving a washer 21 (FIG. 8) which secures the hinge 15 in place in a manner more fully described hereinafter.

The frame 10 is provided with two arcuate recesses 19 for loosely receiving the complementary arcuate ends of the temple members 12 and 13 thereby to provide attractive appearing intersections. This construction provides a stop between the temple member and the lens frame irrespective of the angle at which the temple is adjusted to meet the lens frame.

Figure 5:
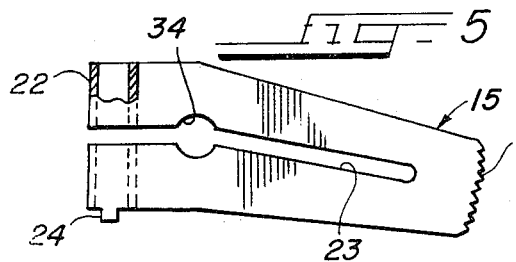
FIG. 5 is a partially sectioned elevational view of a hinge piece embodying certain features of the invention.
Figure 6:
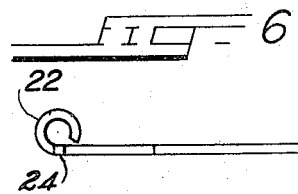
FIG. 6 is a bottom plan view of the hinge of FIG. 5.
Figure 8:
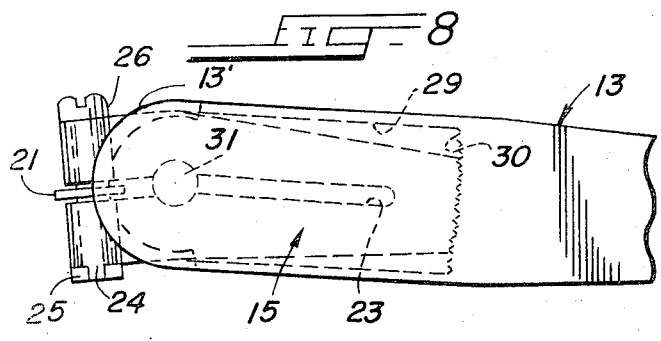
FIG. 8 is a side elevational view of the assembly of FIG. 7, also illustrating the screw and washer used for locking the hinge piece to the lens frame.

As best shown in FIGS. 5 and 6, the hinge 15, which is preferably formed of metal, has a curled forward end portion 22 which is generally cylindrical in shape having an outer diameter substantially equal to the diameter of the recess 17. A slot 23 extends through the curled end 22 a substantial distance rearwardly in the hinge piece 15, and as best shown in FIG. 8 the washer 21 fits within the portion of the slot 23 extending through the curled end 22. The hinge piece 15 includes a tab 24 which is pressed into a recess in a nut 25 which threadedly receives a machine screw 26. In order to assemble the hinge piece 15 to the frame 10, the nut 25 is attached to the hinge piece 15 and the assembly is inserted into the hole 17. Thereafter, the washer 21 is inserted into the slot 23 in the hinge piece 15 and into the recess 20 so as to align the hole in the washer with the hole through the curled end 22 of the hinge piece. Then, the screw 26 is inserted through the curled end 22 of the hinge piece 15 and the washer 21 and threaded into the nut 25 thereby securing the hinge piece 15 to the lens frame 10.

Figure 7:
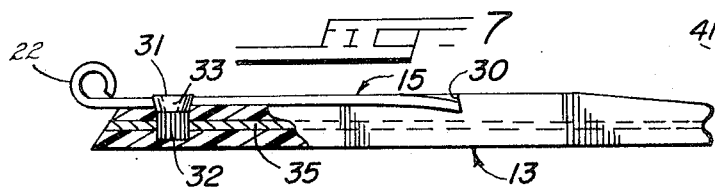
FIG. 7 is a plan view, partly in section, showing the hinge piece of FIGS. 5 and 6 assembled to a temple.

In order to permit angular adjustment between the hinge piece 15 and the temple member 13, the rearward distal end of the hinge piece 15 is provided with a serrated edge 28 and the temple member 13 is provided on its inner face with a generally rectangular recess 29 having the rearward edge 30 also serrated to fit with the serrated edge 28 of the hinge piece 15. A stud 31, whose body portion 32 is fixedly secured in the temple member 13 as by welding to the metal core 35 of the temple member, has a flared out head portion 33. The slot 23 in the hinge piece 15 is enlarged at 34 so that the hinge piece 15 is secured to the temple member 13 by snapping the enlarged portion 34 over the head of the stud 31. As shown in FIG. 7, the serrated portion 30 of the temple member 13 is undercut so that the complementary fitting serrated edges of the hinge member 15 and the temple member 13 are held in the selected position once the hinge piece 15 is snapped over the stud 31. It will be understood by those skilled in the art that the temple members will ordinarily be attached to the eyeglass frame at the time the glasses are being fitted so that variations in the height between the ears and the eyes of the user can be accommodated with this lens frame without any bending or other distortion of the frame or the hinge pieces.

Figure 9:
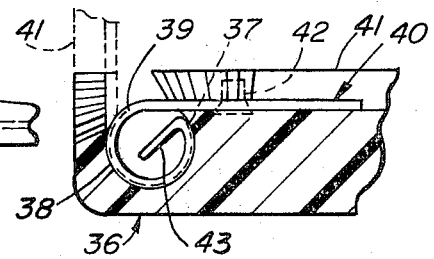
FIG. 9 is a partly sectioned view illustrating another embodiment of the present invention.

Referring to FIG. 9, there is shown a fragmentary, cross-sectional view of an eyeglass frame hinge construction embodying another aspect of the present invention. As there shown, a lens frame member 36 is provided with a generally cylindrical recess 37 which is provided with a cylindrically undercut central section 38 in which is received the curled cylindrical end 39 of a hinge piece 40. The hinge piece 40 is secured to a temple member 41 by means of a stud 42 in the same manner as the hinge pieces 14 and 15 are connected to the temple members 12 and 13 in the embodiment of FIG. 1. In the embodiment of FIG. 9, no additional attaching means such as the washer 21, the nut 25, and the screw 26 are used, but rather, the natural spring tension in the curled end 39 of the hinge member 40 prevents spurious disassembly of the hinge member 40 from the lens frame 36. Inasmuch as the curled end 39 fits within the undercut portion 38, it cannot spuriously move in a vertical direction out of the lens frame 36. A tongue 43 is provided on the end of the curl 39 and forms a key to facilitate contracting of the curled end 39 to permit removal of the hinge 40 from the undercut.

In order to assemble the hinge 40 to the lens frame 36, it is merely necessary to position the curled end opposite to the undercut portion 38 of the recess 37 and press it into the frame whereby the curled end snaps into place in the recess within the lens frame. A particular advantage of this embodiment of the present invention is the substantial reduction in parts as compared to the eyeglass hinges of the prior art.

Referring to FIGS. 10 through 14, a hinge assembly 45 comprises a hinge piece 46 which pivotally connects a temple member 47 to a lens frame 48. The temple member 47 and the lens frame 48 may be molded of plastic and the temple member includes a metallic reinforcing bar or core 49. The hinge piece 46 includes a curled cylindrical end portion 50 and a rearwardly extending planar portion 51 provided with a serrated rear edge surface 52 for adjustable angular engagement with a serrated rear edge 53 of a recess 54 in the temple member. A stud 55 is welded or brazed to the bar 49 and extends through a hole 58 in the hinge portion 51. The stud 55 is provided with an annular groove near its distal end to receive a split snap ring 56 which removably secures the hinge piece to the temple member. Overhang 64 adds support for hinge portion 51 in assembly.

In this embodiment of the invention the curled end 50 is molded directly into the lens frame whereby the end 50 provides the core around which the hinge socket is formed thereby to insure a good fit and to eliminate the need for later assembly of the hinge piece to the lens frame. In order to insure a smoothly operating, long lasting hinge assembly, a pair of headed stud members 60 and 61 suitably formed of a self lubricating material such as a nylon phenolic have shank portions 62 and 63 respectively which fit into the curled end 50 to provide internal bearing surfaces therefor. As shown, the heads of the studs 60 and 61 are knurled. These studs are assembled to the hinge piece and inserted into the mold prior to molding the lens frame, whereby the heads are embedded in the frame to provide a securely mounted hinge assembly and to be invisible in the final eyeglass frame. The use of two studs is preferable to minimize the shear stress thereon and prevent loosening of the hinge. Knurled heads 60 and 61 prevent their turning.

While the present invention has been described in connection with particular embodiments thereof, it will be understood that many changes and modifications may be made without departing from the true spirit and scope of the present invention. It is intended, therefore, to cover all such changes and modifications in the appended claims.

What is claimed is:

1. In an opthalmic mounting, the combination comprising
an integral lens frame having therein a generally cylindrical recess open along one elemental side through an angle less than 180°, a temple member, a hinge piece extending from said temple member and having an end portion substantially in the shape of a cylindrical pivotally disposed in said recess, said recess is semicylindrical with an intermediate arcuate groove therein, said end of said hinge piece is provided with a slot, a washer is disposed in said slot and said groove, and a fastener extends through said end and said washer for securing said washer to said hinge piece.

2. The combination set forth in claim 1, comprising means for adjusting the angular position of said temple member relative to said hinge.

3. The combination set forth in claim 2, wherein said lens frame is provided with an arcuate recess, and said temple member has an arcuate end disposed in said recess only when said temple member is in an open usable position.

4. The combination set forth in claim 1, wherein said hinge piece has an elongated slot with an enlarged open portion intermediate the ends thereof, and a stud fixed to said temple member, said hinge being snap-fitted onto said stud member.

5. The combination set forth in claim 4, wherein said temple member is provided with an undercut shoulder under which one end of said hinge piece is positioned.

6. The combination set forth in claim 5, wherein said one end of said hinge piece and said undercut shoulder are serrated.

7. In an opthalmic mounting, the combination comprising a lens frame, a hinge piece hingedly attached to said frame near one end thereof, said hinge piece having a rearwardly extending portion, a temple member having an elongated recess in the inner side near the foreward end thereof, said rearwardly extending portion of said hinge piece being disposed in said recess, an undercut shoulder on said temple member defining the rear end of said recess, the rear end of said hinge piece extending under said shoulder, a fastener means extending through a hole in said hinge piece into said temple member for pivotably fastening said temple member to said hinge piece, and said recess being substantially wider than the rearwardly extending portion of said hinge piece to permit pivotable adjustment of said temple member relative to said hinge piece.

8. The combination according to claim 7 wherein said rear end of said recess is serrated beneath said shoulder and said rear end of said hinge piece coacts with said serrations to hold said hinge piece in an adjusted position relative to said temple member.

9. The combination according to claim 8 wherein said rear end of said hinge piece is pointed.

10. The combination according to claim 7 wherein said rearwardly extending portion of said hinge piece is flat and has a thickness no greater than the depth of said recess.

11. The combination according to claim 7 wherein said frame has a rearwardly facing recess defined by a frusto-conical wall section, and the foreward end of said temple member is a frusto-conical section and is disposed in said recess when said temple member is in a fully open position, said frusto-conical sections being substantially complementary.

12. The combination according to claim 11 wherein the outer edge portion of said frame and the outer side of said temple member are flush when said temple member is in the fully open position.

* * * * *